Oct. 3, 1961 A. F. RUS 3,002,539

DEVICE FOR STRAIGHTENING WIRE LEADS OF ELECTRICAL COMPONENTS

Filed Nov. 13, 1957 2 Sheets-Sheet 1

INVENTOR
A. F. RUS
BY C. R. Hamilton
ATTORNEY

INVENTOR
A. F. RUS
BY C. B. Hamilton
ATTORNEY

United States Patent Office 3,002,539
Patented Oct. 3, 1961

3,002,539
DEVICE FOR STRAIGHTENING WIRE LEADS OF ELECTRICAL COMPONENTS

Albert F. Rus, Chicago, Ill., assignor to Western Electric Company, Incorporated, New York, N.Y., a corporation of New York
Filed Nov. 13, 1957, Ser. No. 696,155
6 Claims. (Cl. 140—147)

This invention relates to a device for straightening wire leads of electrical components and more particularly to a mechanism for straightening the leads on opposite ends of electrical components.

An object of the present invention is to provide a simple device for straightening wire leads of electrical components.

Another object of the invention is the provision of a device for supporting an electrical component having coaxially disposed wire leads on opposite ends thereof and for rolling successive portions of the leads into a straightened condition.

With these and other objects in view, the present invention contemplates the provision of a pair of rolls mounted side by side for rotation in the same direction about parallel axes and having cylindrical surfaces engageable with opposite sides of wire leads extending axially from opposite ends of an electrical component for supporting the component for rotation about its axis, and in a position above a plane through the axes of the rolls, the rolls having annular clearance grooves for receiving the body of the electrical component. The cylindrical lead straightening surfaces which engage opposite sides of the wire leads, vary progressively in length in an axial direction with portions thereof being longer than the leads, and these lead straightening surfaces are arranged initially so that when an electrical component is placed in the device the shortest portions of the cylindrical straightening surfaces of the rollers engage the wire leads adjacent the body portion of the electrical component, and as the rolls are rotated, the portions of the leads that are gripped between the straightening surfaces are rolled straight, and as the rolls continue their rotation through one revolution, progressively longer portions of the straightening surfaces thereof engage and straighten progressively longer portions of the wire leads.

Other objects and advantages of the invention will become apparent by reference to the following drawings detailed descriptions thereof and the accompanying drawings illustrate a preferred embodiment thereof, in which—

Figure 3:
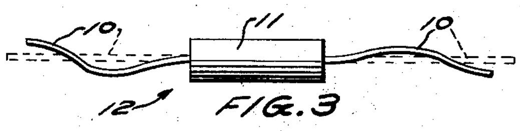
FIG. 3 is a view of an electrical component having leads thereon which are to be straightened in the present device.

Referring to the drawings, the present device is designed to straighten wire leads 10 (FIG. 3) extending from opposite ends of a body 11 of electrical components 12 into coaxial alignment with each other.

The device comprises a pair of lead straightening rolls 14 and 15 which are fixedly mounted on shafts 16 and 17 in side by side relation to each other for rotation about horizontal parallel axes. The shafts 16 and 17 are rotatably supported in bearing apertures in the upper ends of bearing brackets 20 mounted on a base 21. Gears 23 and 24 are secured to the shafts 16 and 17 and mesh with an idler gear 25 rotatably supported on a bracket 20 to interconnect the rolls 14 and 15 for rotation in the same direction. Rotation may be imparted to the rollers by any suitable means as for example, a crank handle 26 secured to one of the shafts.

Each of the rolls 14 and 15 is provided on its periphery with a pair of cylindrical lead straightening surfaces 28 which are spaced apart in an axial direction to provide a clearance groove or space 30 (FIGS. 1 and 2) for receiving the body 11 of the electrical component therebetween.

Figure 6:
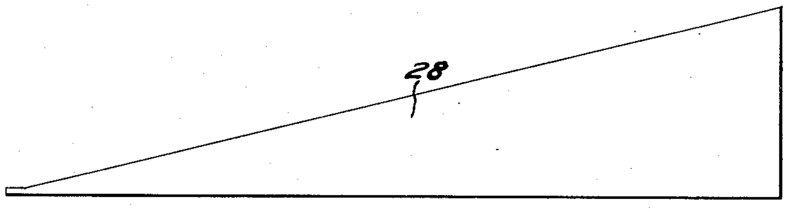
FIG. 6 is a developed view of one of the wire straightening surfaces of the wire straightening device.

As viewed from one end (FIG. 4) the cylindrical lead straightening surfaces 28 of the rolls 14 and 15 are disposed in close proximity to each other substantially to form a V-shaped groove into which the leads of an electrical component may be dropped. The leads of the component so dropped engage the straightening surfaces 28 of the rolls and the component is supported thereby in a position above a horizontal plane passing through the axes of the rolls for rotation about the axis of the electrical component. Each of the cylindrical straightening surfaces 28 is irregularly shaped—a development thereof conforming generally to a right angle triangle as shown in FIG. 6—to provide lead engaging surfaces of progressively increasing length in an axial direction, beginning with a relatively short length and increasing to a length greater than that of the lead to be straightened. These straightening surfaces 28 are arranged as shown in FIGS. 1, 2 and 4 so that the leads 10 of a component 12 will be supported between and in engagement with successive corresponding portions of the lead engaging surfaces of the rolls, the corresponding portions of the lead engaging surface being of equal length and increasing progressively from the shortest to the longest.

Figure 1:
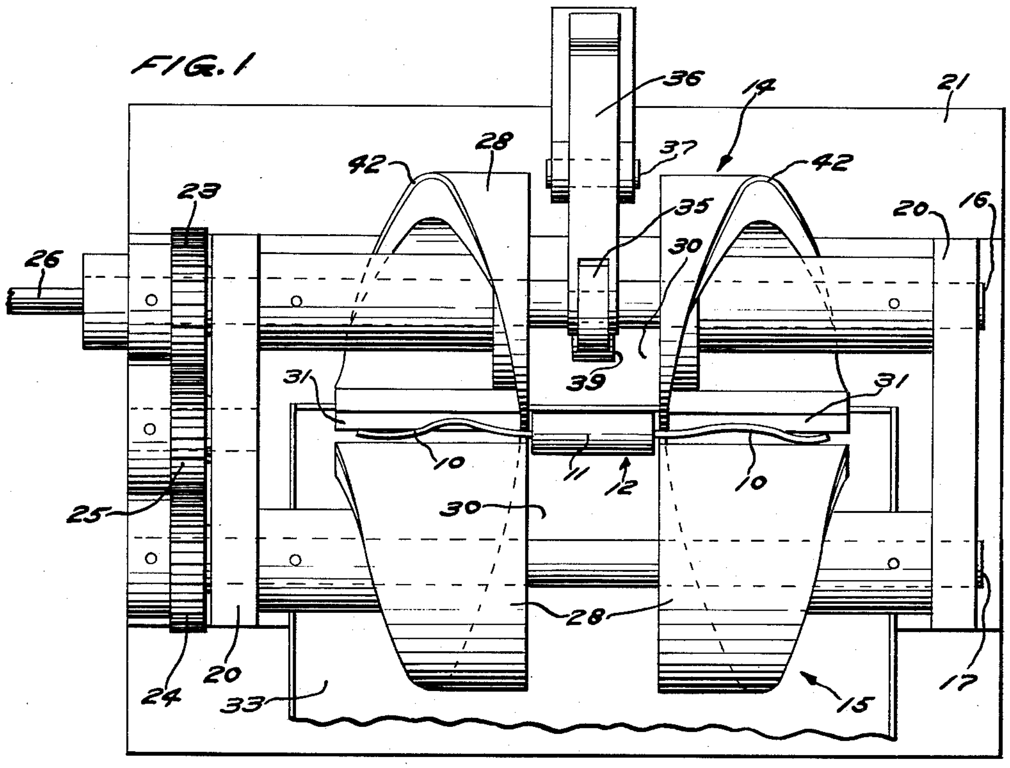
FIG. 1 is a plan view of the wire lead straightening device embodying the features of the invention.
Figure 2:
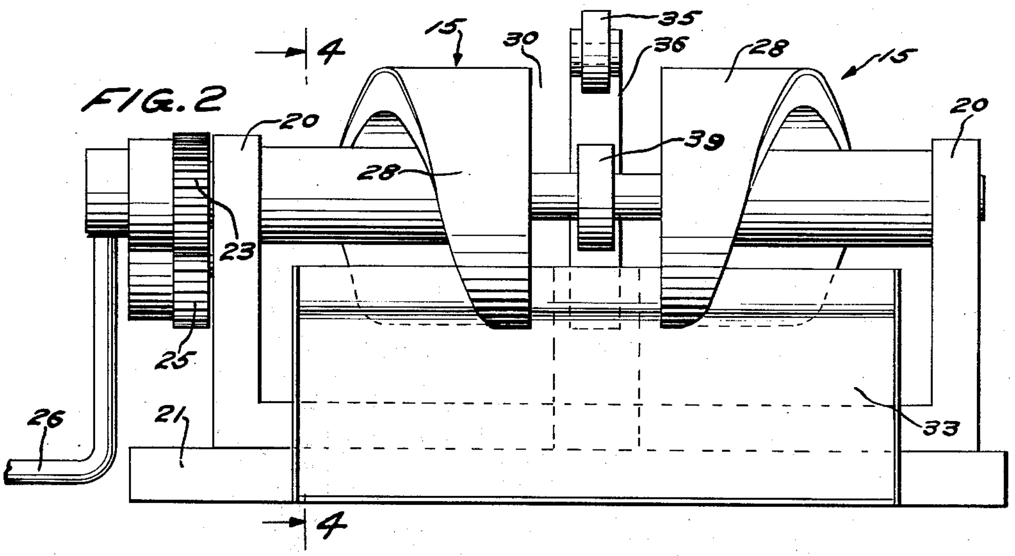
FIG. 2 is a front view of the lead straightening device.
Figure 4:
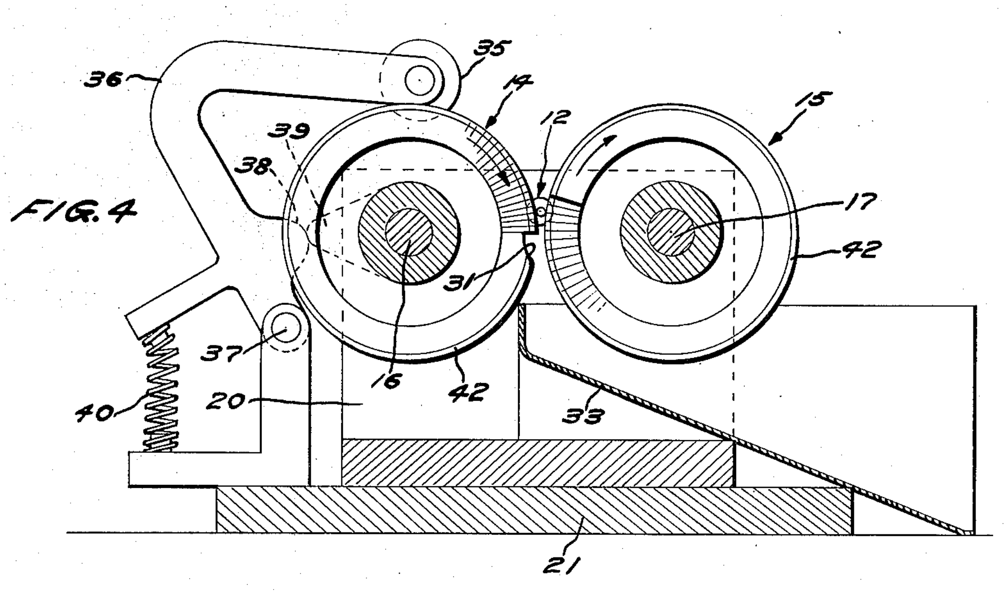
FIG. 4 is a vertical sectional view through the lead straightening device taken along the line 4—4 of FIG. 2 and showing a hold-down roller in its retracted position.

To straighten the wire leads 10 of an electrical component 11, the component is dropped into engagement with the rolls 14 and 15 in the position shown in FIGS. 1 and 4 with the wire straightening surfaces 28 arranged with the shortest portion of the surfaces 28 positioned for engaging short portions of the wire leads 10 adjacent the body 11 of the electrical component. The handle 26 is then actuated to rotate the rolls 14 and 15 and cause successively longer portions of the wire straightening surfaces 28 to engage the wire leads and progressively straighten successively longer portions thereof.

Longitudinally disposed notches 31 are provided in the periphery of the roller 14 to provide sufficient clearance between the rolls 14 and 15 to permit the straightened leads 10 to pass therebetween on completion of the lead straightening operation and thus allow the component 12 to drop from between the straightening rolls. An inclined plate 33 is provided to direct the straightened components forwardly to a position where they are accessible for removal from the device.

Figure 5:
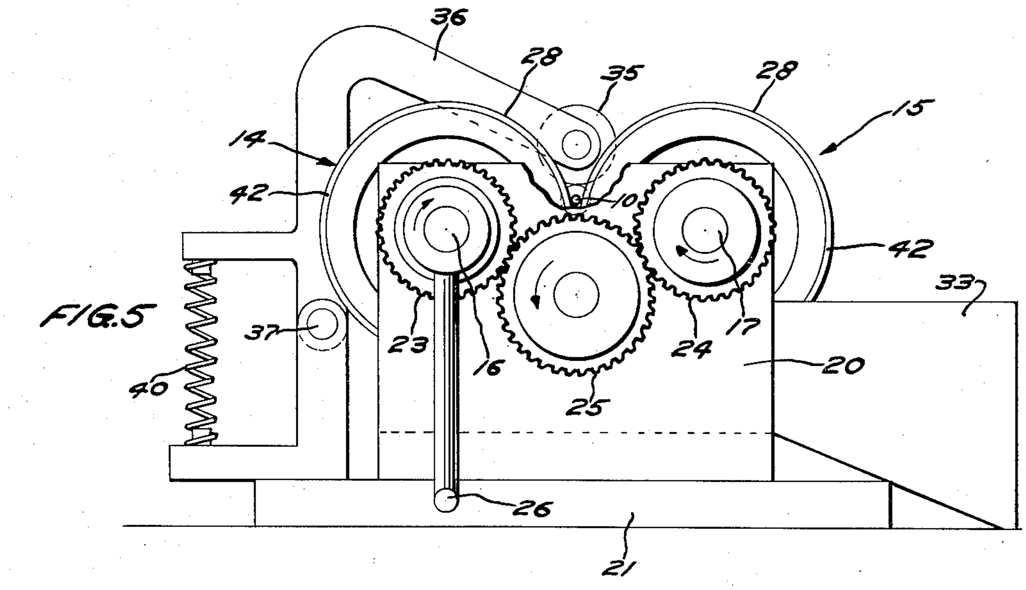
FIG. 5 is an end view of the wire lead straightening device showing the hold-down roller in operative position.

Means are provided for holding the electrical component in engagement with the straightening rolls during the wire straightening operation which includes a hold-down roller 35 rotatably supported on an arm 36. The arm 36 is mounted for pivotal movement about a fixed pivot 37 and has an abutment 38 engageable with a cam 39 on the shaft 16. A spring 40 urges the arm 36 in a clockwise direction and cooperates with the cam 39 to effect the movement of the hold-down roller 35 to an operative position in engagement with the body 11 of the component 12 as shown in FIG. 5 for yieldably holding the electrical component against the straightening rolls 14 and 15, and to a retracted position (FIG. 4) permitting the loading of an electrical component into the device.

The outer portions of the rolls 14 and 15 are preferably formed with a layer 42 of rubber or other suitable material bonded to the steel cores of the rolls and with the outer surface of the rubber layer ground to provide lead straightening surfaces 28 thereon which are capable of effecting a good frictional driving engagement with the leads 11 and of effectively straightening them.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In a device for straightening wire leads of electrical components, a pair of members having lead straightening surfaces engageable with a lead of an electrical component, means for mounting said members for movement relative to each other along predetermined paths with said lead straightening surfaces in engagement with opposite sides of a lead placed therebetween, said lead straightening surfaces varying in length in a direction parallel to the lead and having predetermined relatively short portions for simultaneously engaging and straightening a short portion of the lead adjacent the component and having successive portions increasing progressively in length to progressively engage and straighten successively longer portions of the leads, and means for effecting relative movement between said members to cause the lead to be rolled between said straightening surfaces and progressively straightened therebetween.

2. In a device for straightening wire leads extending from opposite ends of electrical components, a pair of cylindrical rolls having peripheral lead straightening surfaces, means for mounting the rolls in side by side relation to each other for rotation about parallel horizontal axes and with the lead straightening surfaces thereof disposed in closely spaced relation to each other for engaging opposite sides of the leads of a component and supporting said component for rotation, and means for rotating said rolls in the same direction, said lead straightening surfaces of one of the rolls corresponding to those of the other and varying in length in an axial direction with portions thereof being relatively short for engaging and straightening portions of the leads adjacent the components and with successive portions of the straightening surfaces increasing progressively in length to progressively engage and straighten successively longer portions of the leads.

3. In a device for straightening wire leads of electrical components, a pair of shafts, means for supporting the shafts in a predetermined parallel relation to each other, lead straightening members on said shafts having cylindrical surfaces positioned adjacent each other for engaging opposite sides of the leads and supporting the electrical component for rotation, said cylindrical straightening surfaces being shaped to engage a small portion of the lead adjacent the fixed end thereof and progressively increasing portions of the leads as the straightening members are rotated to progressively straightening successively longer portions of the lead, means for rotating the shafts in the same direction, and a longitudinal recess in the periphery of one of said straightening members providing clearance between the members for releasing the leads and allowing the components to drop between the members after their leads have been straightened.

4. In a device for straightening wire leads extending from opposite ends of electrical components, a pair of cylindrical rolls having peripheral lead straightening surfaces, means for mounting the rolls in side by side relation to each other for rotation about parallel horizontal axes and with the lead straightening surfaces thereof disposed in closely spaced relation to each other for engaging opposite sides of the leads of a component and supporting said component for rotation, means for rotating said rolls in the same direction, said lead straightening surfaces of one of the rolls corresponding to those of the other and varying in length in an axial direction with portions thereof being relatively short for engaging and straightening portions of the leads adjacent the components and with successive portions of the straightening surfaces increasing progressively in length to progressively engage and straighten successively longer portions of the leads, one of said rolls having an axially directed peripheral recess providing clearance between the rolls for allowing the leads to pass therethrough, and means for holding the electrical component in engagement with the rolls during the lead straightening operation.

5. In a device for straightening wire leads extending from opposite ends of electrical components, a pair of rolls having a peripheral layer of rubber bonded to each roll to provide cylindrical frictional lead straightening surfaces, means for mounting the rolls in side by side relation to each other for rotation about parallel horizontal axes to form a substantially V-shaped groove therebetween and with the lead engaging surfaces disposed in close proximity to each other for engaging opposite sides of the leads of a component place in said groove to support said component for rotation, said lead straightening surfaces of the rolls varying in length in an axial direction with portions thereof being relatively short for engaging and straightening portions of the leads adjacent the components and with successive portions thereof increasing progressively in length to progressively engage and straighten successively longer portions of the leads, one of said rolls having an axially directed peripheral recess providing clearance between the rolls for releasing the leads and allowing the electrical component to drop therefrom on completion of the lead straightening operation, and means for rotating the rolls in the same direction.

6. In a device for straightening wire leads extending from opposite ends of electrical components, a pair of rolls having cylindrical frictional lead straightening surfaces, means for mounting the rolls in side by side relation to each other for rotation about parallel horizontal axes to form a substantially V-shaped groove therebetween and with the lead engaging surfaces disposed in close proximity to each other for engaging opposite sides of the leads of a component placed in said groove to support said component for rotation, means for rotating said rolls in the same direction to rotate the component, said lead straightening surfaces of the rolls varying in length in an axial direction and having relatively short portions for engaging and straightening short portions of the leads adjacent the components and having successive portions of progressively increasing length to progressively engage and straighten successively longer portions of the leads, one of said rolls having an axially directed peripheral recess providing clearance between the rolls for releasing the leads and allowing the electrical component to drop therefrom on completion of the lead straightening operation, a roller, and means movably supported on said mounting means for supporting the roller and for moving the roller to and from an operative position above and in engagement with a component being straightened to hold the component in engagement with the rolls during the lead straightening operation.

References Cited in the file of this patent

UNITED STATES PATENTS

| | | |
|---|---|---|
| 994,941 | Lewis | June 13, 1911 |
| 1,045,161 | Machlet | Nov. 26, 1912 |
| 1,109,662 | Cavanagh | Sept. 8, 1914 |
| 2,550,842 | McClure | May 1, 1951 |
| 2,771,206 | Daniels | Nov. 20, 1956 |
| 2,867,262 | Ainsworth et al. | Jan. 6, 1959 |
| 2,878,841 | Peterson | Mar. 24, 1959 |